(12) United States Patent
Araki

(10) Patent No.: US 8,464,305 B2
(45) Date of Patent: Jun. 11, 2013

(54) CONTENT REPRODUCTION APPARATUS AND CONTENT REPRODUCTION METHOD

(75) Inventor: Katsuhiko Araki, Hino (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 13/464,344

(22) Filed: May 4, 2012

(65) Prior Publication Data

US 2013/0086620 A1 Apr. 4, 2013

(30) Foreign Application Priority Data

Sep. 30, 2011 (JP) .................................. 2011-217722

(51) Int. Cl.
*H04N 7/173* (2011.01)
(52) U.S. Cl.
USPC .............................. 725/116; 725/109; 725/118
(58) Field of Classification Search
USPC ........................................... 725/109, 116, 118
See application file for complete search history.

(56) References Cited

U.S. PATENT DOCUMENTS

2010/0318860 A1 12/2010 Ohbi

FOREIGN PATENT DOCUMENTS

| JP | 2004-312121 | 11/2004 |
|----|-------------|---------|
| JP | 2007-267116 | 10/2007 |
| JP | 2007-288269 | 11/2007 |
| JP | 2008-079114 | 4/2008 |
| JP | 2009-049919 | 3/2009 |
| JP | 2009-272945 | 11/2009 |
| JP | 2009-278239 | 11/2009 |
| JP | 2010-026215 | 2/2010 |
| JP | 2010-288158 | 12/2010 |
| JP | 2011-035503 | 2/2011 |

*Primary Examiner* — Kieu Oanh T Bui

(74) *Attorney, Agent, or Firm* — Patterson & Sheridan, LLP

(57) ABSTRACT

According to one embodiment, a content reproduction apparatus includes a first communication module, acquisition module, reproduction module, second communication module, and control module. The acquisition module acquires content from a server through the first communication module. The reproduction module reproduces the content. The control module outputs command and data to a content reproduction device through the second communication module to thereby control the content reproduction device in a reproduction preparatory state, and outputs a synchronization clock, and reproduction request to the content reproduction device to thereby control the content reproduction device in a reproduction state.

9 Claims, 7 Drawing Sheets

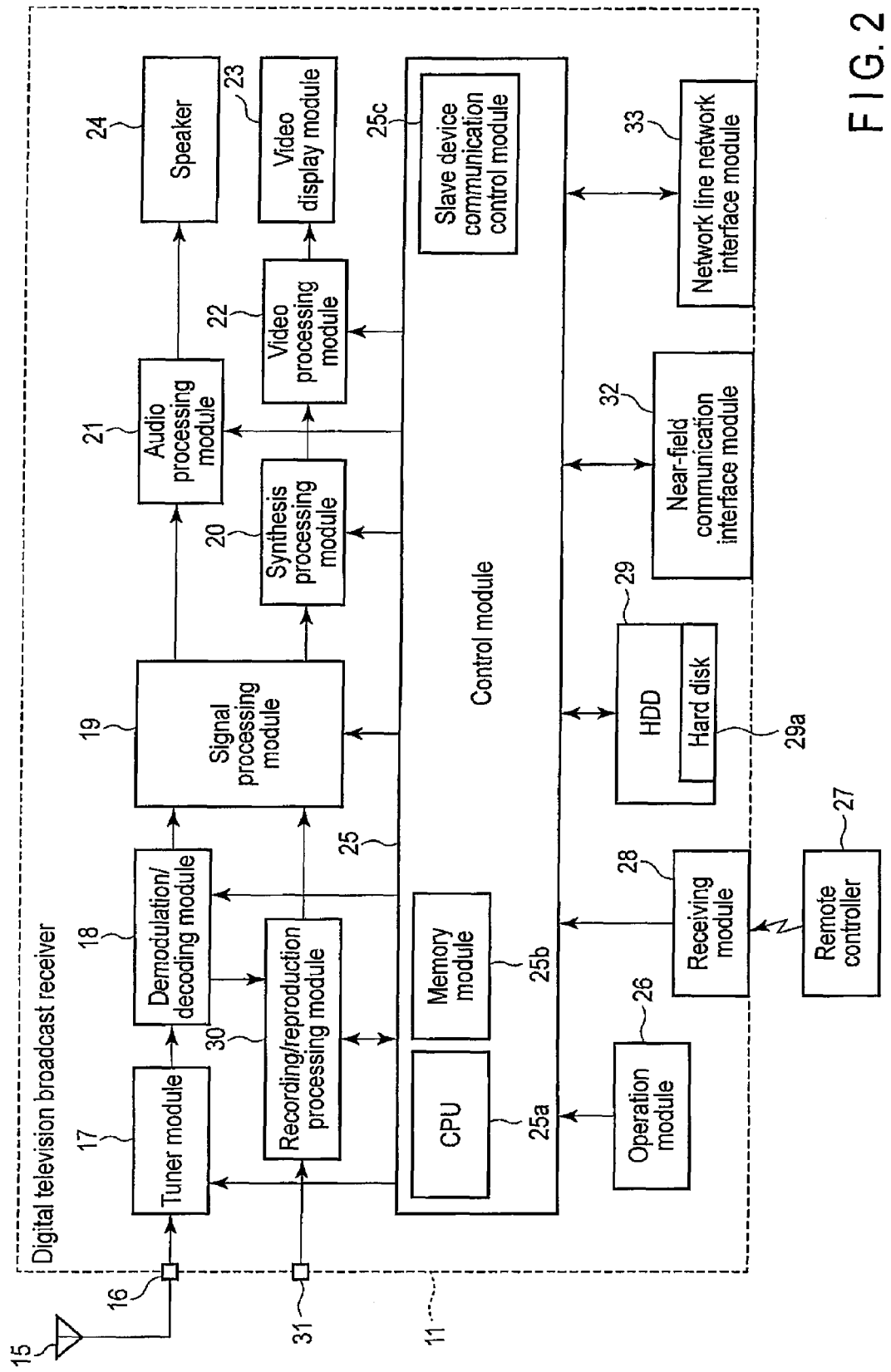
F I G. 2

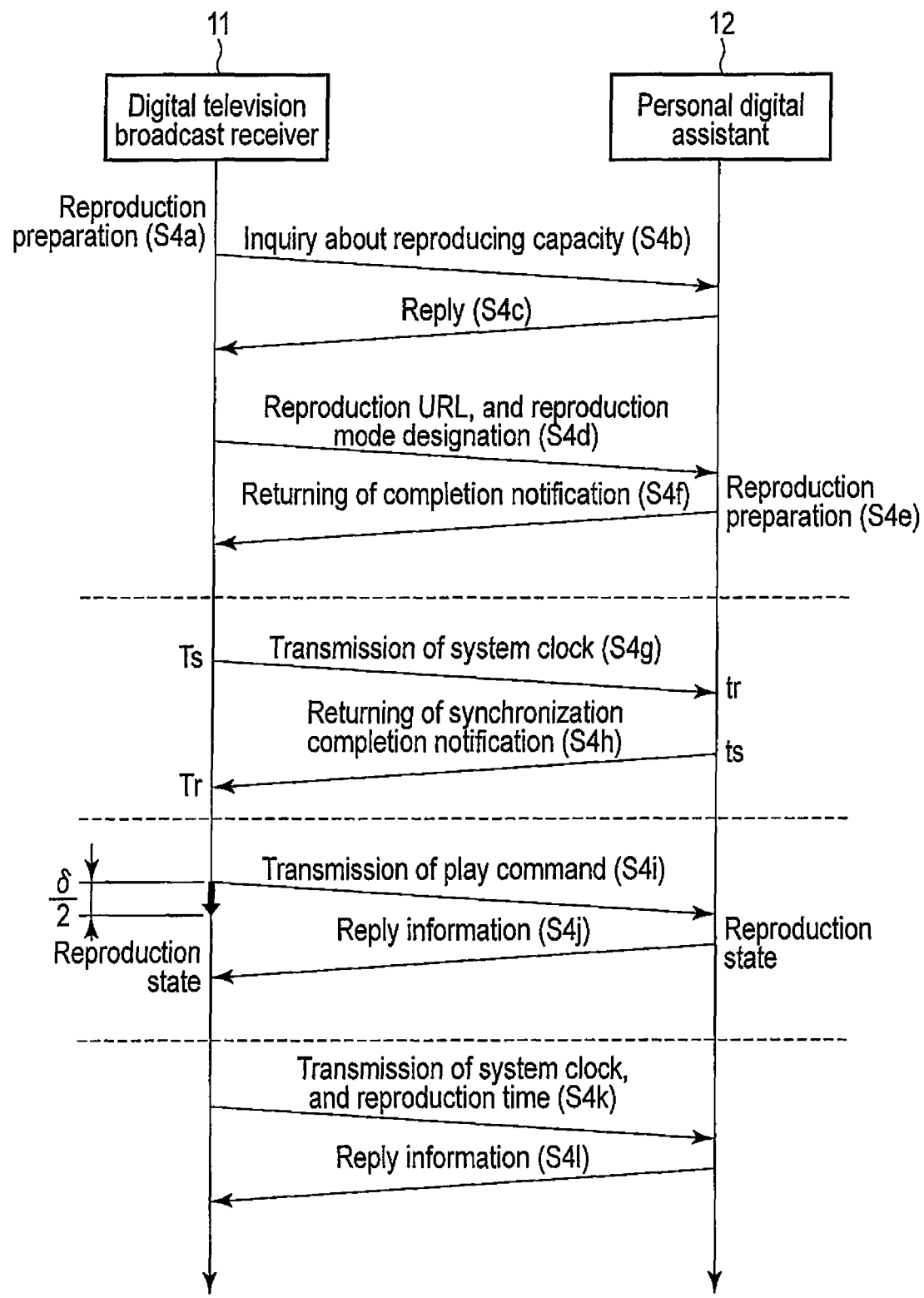
F I G. 4

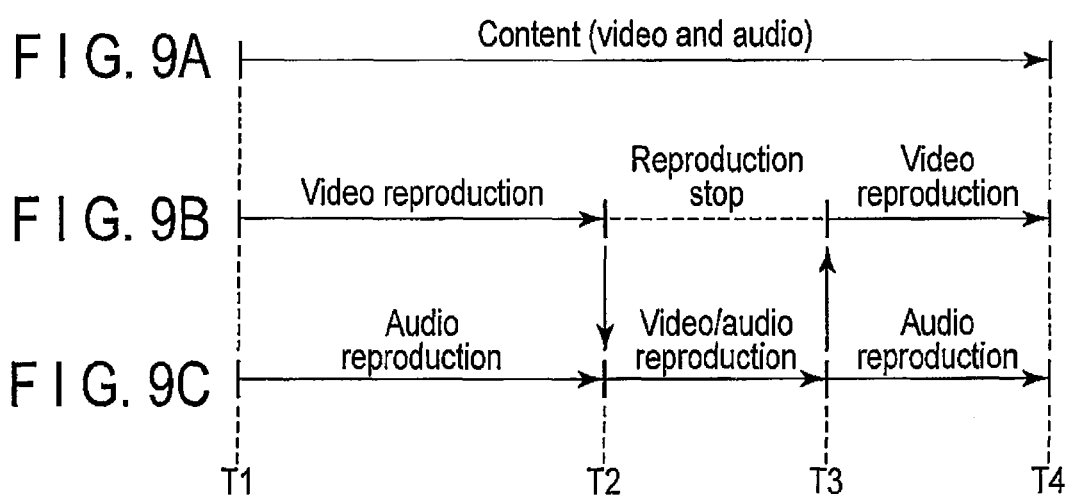

CONTENT REPRODUCTION APPARATUS AND CONTENT REPRODUCTION METHOD

CROSS-REFERENCE TO RELATED APPLICATIONS

This application is based upon and claims the benefit of priority from prior Japanese Patent Application No. 2011-217722, filed Sep. 30, 2011, the entire contents of which are incorporated herein by reference.

FIELD

Embodiments described herein relate generally to a content reproduction apparatus configured to synchronously reproduce content between itself and a device at the other end which serves as a host or slave with respect to the apparatus, and a content reproduction method.

BACKGROUND

As is generally known, when content such as video, audio or the like is synchronously reproduced between a content reproduction device serving as a host such as a digital television broadcast receiver or the like, and a content reproduction device serving as a slave such as a personal digital assistant, it is common that the reproduction is carried out by transmitting a stream from the host device to the slave device.

Incidentally, by such a method, when the host content reproduction device and slave content reproduction device are connected to each other so that content can be transmitted between these devices either by wired connection or by wireless connection, it becomes necessary to set a broadband communication path capable of transmitting a stream adaptable to video, audio or the like, thereby lowering the degree of freedom of the case where a user carries out synchronous reproduction by combining arbitrary content reproduction devices with each other.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is a block diagram shown to explain an example of a signal processing system of a digital television broadcast receiver constituting the synchronous content reproduction system of the embodiment.

FIG. 4 is a flowchart shown to explain an example of main processing operations to be carried out by the synchronous content reproduction system of the embodiment.

Each of FIG. 9A, FIG. 9B, and FIG. 9C is a view shown to explain an example of a reproduction operation to be carried out by the digital television broadcast receiver and personal digital assistant of the embodiment.

DETAILED DESCRIPTION

Various embodiments will be described hereinafter with reference to the accompanying drawings. In general, according to one embodiment, a content reproduction apparatus comprises a first communication module, acquisition module, reproduction module, second communication module, and control module. The acquisition module acquires content from a server on a network through the first communication module, and the reproduction module reproduces the content. The control module outputs commands inquiring about reproduction capacity, commands designating a reproduction mode, and data indicating an acquisition place of content acquired by the acquisition module to a content reproduction device serving as a slave through the second communication module to thereby control the content reproduction device in a reproduction preparatory state, and outputs a synchronization clock for reproduction, and reproduction request command to the content reproduction device to thereby control the content reproduction device in a reproduction state.

Figure 1:
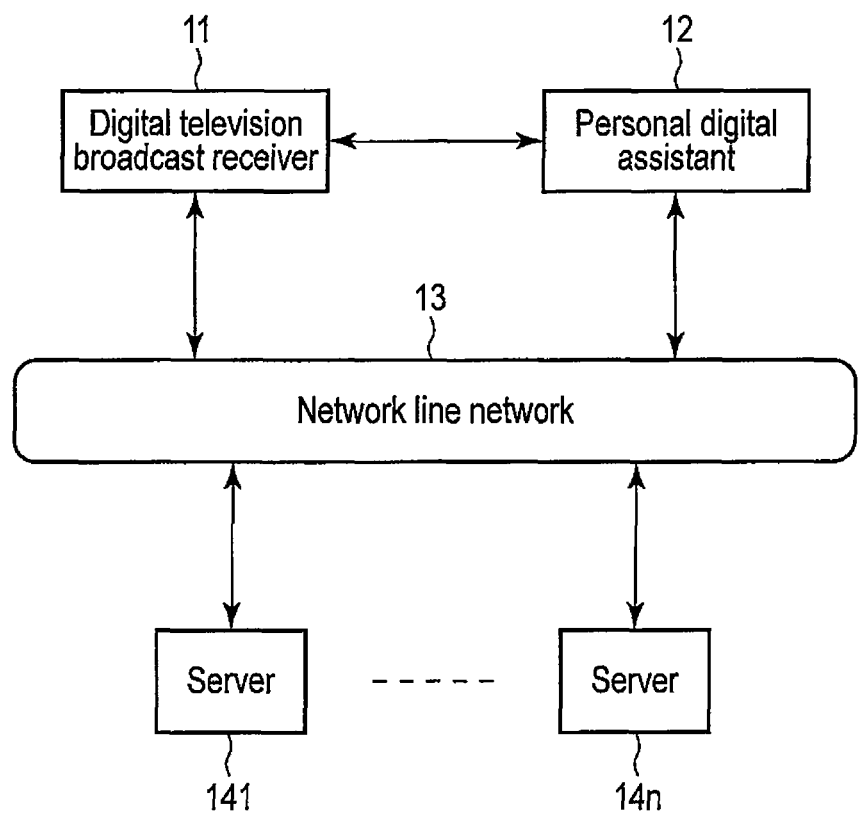
FIG. 1 is a block diagram shown to schematically explain an example of a synchronous content reproduction system as an embodiment.

FIG. 1 schematically shows an example of a synchronous content reproduction system to be described in this embodiment. That is, this synchronous content reproduction system is provided with a digital television broadcast receiver 11 functioning as a content reproduction device serving as a host, and personal digital assistant 12 functioning as a content reproduction device serving as a slave.

Among these, the digital television broadcast receiver 11 is connected to, for example, a network line network 13 such as the Internet or the like, can arbitrarily and selectively access various servers 141 to 14n present on the network line network 13, and can acquire content provided by each server and reproduce video, audio or the like.

Further, the personal digital assistant 12 is also connected to the network line network 13, can arbitrarily and selectively access various servers 141 to 14n, and can acquire content provided by each server and reproduce video, audio or the like. It should be noted that as this personal digital assistant 12, for example, a smartphone or the like is assumed.

Further, the above-mentioned digital television broadcast receiver 11 and personal digital assistant 12 are connected to each other in such a manner that content transmission can be carried out between them. Regarding the content transmission, it is not necessary to set a broadband communication path capable of transmitting a stream adaptable to video, audio or the like, and, for example, wireless transmission using an infrared ray, electric wave or the like as a transmission medium, wired transmission or the like utilizing the Internet, home network line network or the like is assumed as the content transmission.

Regarding the synchronous content reproduction system configured as described above, an outline of an operation thereof will be described below. That is, the digital television broadcast receiver 11 serving as the host can access a desired server (for example, the server 141) on the basis of an operation of the user, acquire desired content from the server, and reproduce video, audio or the like.

In this case, the digital television broadcast receiver 11 can instruct, on the basis of the operation of the user, the personal digital assistant 12 serving as the slave to access the same server 141 and acquire the same content. Thereby, the personal digital assistant 12 can carry out reproduction of video, audio or the like on the basis of the acquired content.

As described above, in the state where each of the digital television broadcast receiver 11 and personal digital assistant 12 has acquired the same content, and can reproduce the content, it is possible to, as an operation example, take a usage pattern in which video is reproduced by the digital television broadcast receiver 11, and audio is reproduced by the personal digital assistant 12.

As the reason for taking such a usage pattern, a case where audio of a data format not supported by the digital television broadcast receiver 11, but supported by the personal digital assistant 12 is to be reproduced, a case where when there are a plurality of viewers, languages (English, Japanese, Chinese, and the like) in which the viewers listen are different, a case where the audio volume of the digital television broadcast receiver 11 cannot be made larger, and it is necessary to hear the audio by the personal digital assistant 12 at hand, and the like are conceivable.

When this usage pattern is taken, the digital television broadcast receiver 11 outputs, on the basis of an operation of the user, various command and data items indicating an acquisition place of content, execution of audio reproduction, data format of the audio to be reproduced, language to be selected, starting position of audio reproduction, and the like, and clock or the like configured to synchronize the audio to be reproduced with the video to be reproduced by the digital television broadcast receiver 11 to the personal digital assistant 12.

Thereby, in the personal digital assistant 12 serving as the slave, it becomes possible to reproduce audio desired by the user in synchronism with the video reproduced by the digital television broadcast receiver 11 on the basis of the various command and data items and the clock supplied from the digital television broadcast receiver 11.

According to the above-mentioned synchronous content reproduction system, it becomes possible to synchronize the video reproduced by the digital television broadcast receiver 11, and audio reproduced by the personal digital assistant 12 with each other without transmitting a stream adaptable to video, audio or the like between the digital television broadcast receiver 11, and personal digital assistant 12, i.e., without providing a broadband communication path capable of transmitting a stream adaptable to video, audio or the like.

Accordingly, it is possible to remarkably improve the degree of freedom of a case where the user combines devices with each other to carry out synchronous reproduction, such as a case where audio of a data format not supported by the host device is reproduced by the slave device, and case where a plurality of persons each having slave devices hear the audio in different languages.

FIG. 2 shows an example of a signal processing system in the digital television broadcast receiver 11. That is, a digital television broadcast signal received by an antenna 15 is supplied to a tuner module 17 through an input terminal 16, whereby a broadcast signal of a desired channel is selected.

The broadcast signal selected by the tuner module 17 is supplied to a demodulation/decoding module 18 to be restored to a digital video signal, and audio signal, and the like, and is thereafter output to a signal processing module 19. The signal processing module 19 subjects each of the video signal, and audio signal supplied from the demodulation/decoding module 18 to predetermined digital signal processing.

Further, the signal processing module 19 outputs the digital video signal to a synthesis processing module 20, and outputs the digital audio signal to an audio processing module 21. Of these modules, the synthesis processing module 20 superposes an on-screen display (OSD) signal on the digital video signal supplied from the signal processing module 19, and outputs the resultant signal.

The digital video signal output from the synthesis processing module 20 is supplied to a video processing module 22 to be converted into a format which can be displayed as video by a video display module 23 in the subsequent stage. Further, the video signal output from the video processing module 22 is supplied to the video display module 23 to be used for video display.

Further, the audio processing module 21 converts the input digital audio signal into an analog audio signal in a format which can be reproduced by a speaker 24 in the subsequent stage. Further, the analog audio signal output from the audio processing module 21 is supplied to the speaker 24, whereby the analog audio signal is used for audio reproduction.

Here, all the operations of the digital television broadcast receiver 11 including the aforementioned various receiving operations are controlled by a control module 25 in a unifying manner. The control module 25 incorporates therein a central processing unit (CPU) 25a, and receives operation commands issued from an operation module 26 provided in the main body of the digital television broadcast receiver 11 or receives operation commands transmitted from a remote controller 27 and received by a receiving module 28 to control each module in such a manner that the operational requirements of the operation commands are reflected.

In this case, the control module 25 utilizes a memory module 25b. The memory module 25b includes a read only memory (ROM) in which mainly a control program to be executed by the CPU 25a is stored, random access memory (RAM) configured to provide a work area to the CPU 25a, and nonvolatile memory in which various setting data items, and control data items, and the like are stored.

Further, a hard disk drive (HDD) 29 is connected to the control module 25. The control module 25 can carry out control in such a manner that on the basis of an operation carried out by the user by using the operation module 26 or an operation of the remote controller 27, the digital video signal and audio signal obtained from the demodulation/decoding module 18 are encrypted by a recording/reproduction processing module 30, are converted into a predetermined recording format, and are thereafter supplied to the HDD 29 to be recorded on a hard disk 29a.

Furthermore, the control module 25 can carry out control in such a manner that on the basis of an operation carried out by the user by using the operation module 26 or an operation of the remote controller 27, a digital video signal and audio signal are read by the HDD 29 from the hard disk 29a, are decrypted by the recording/reproduction processing module 30, and are thereafter supplied to the signal processing module, whereby the decrypted video signal and audio signal are hereafter used for the video display and audio reproduction.

Further, the digital television broadcast receiver 11 is provided with an input terminal 31 configured to directly input a digital video signal, and audio signal from outside. A digital video signal, and audio signal input through the input terminal 31 are supplied to the signal processing module 19 through the recording/reproduction processing module 30 on the basis of the control of the control module 25, and are hereafter used for the video display, and audio reproduction.

Furthermore, the digital video signal, and audio signal input through the input terminal 31 are used for recording/reproduction on/from the hard disk 29a carried out by the HDD 29 through the recording/reproduction processing module 30 on the basis of the control of the control module 25.

Further, a near-field communication interface module 32 is connected to the control module 25. The near-field communication interface module 32 is configured to carry out near-field communication using, for example, infrared rays as a transmission medium, and enables the control module 25 to carry out interactive command transmission between the control module 25 and personal digital assistant 12.

Furthermore, a network line network interface module 33 is connected to the control module 25. The network line network interface module 33 is connected to the above-mentioned network line network 13, whereby it is possible for the control module 25 to arbitrarily and selectively access various servers 141 to 14n present on the network line network 13, and acquire desired content.

Further, the control module 25 is provided with a slave device communication control module 25c. The slave device communication control module 25c controls transmission processing of various commands and a synchronization clock to the personal digital assistant 12 serving as the slave device, and analysis processing of responses from the personal digital assistant 12.

Figure 3:
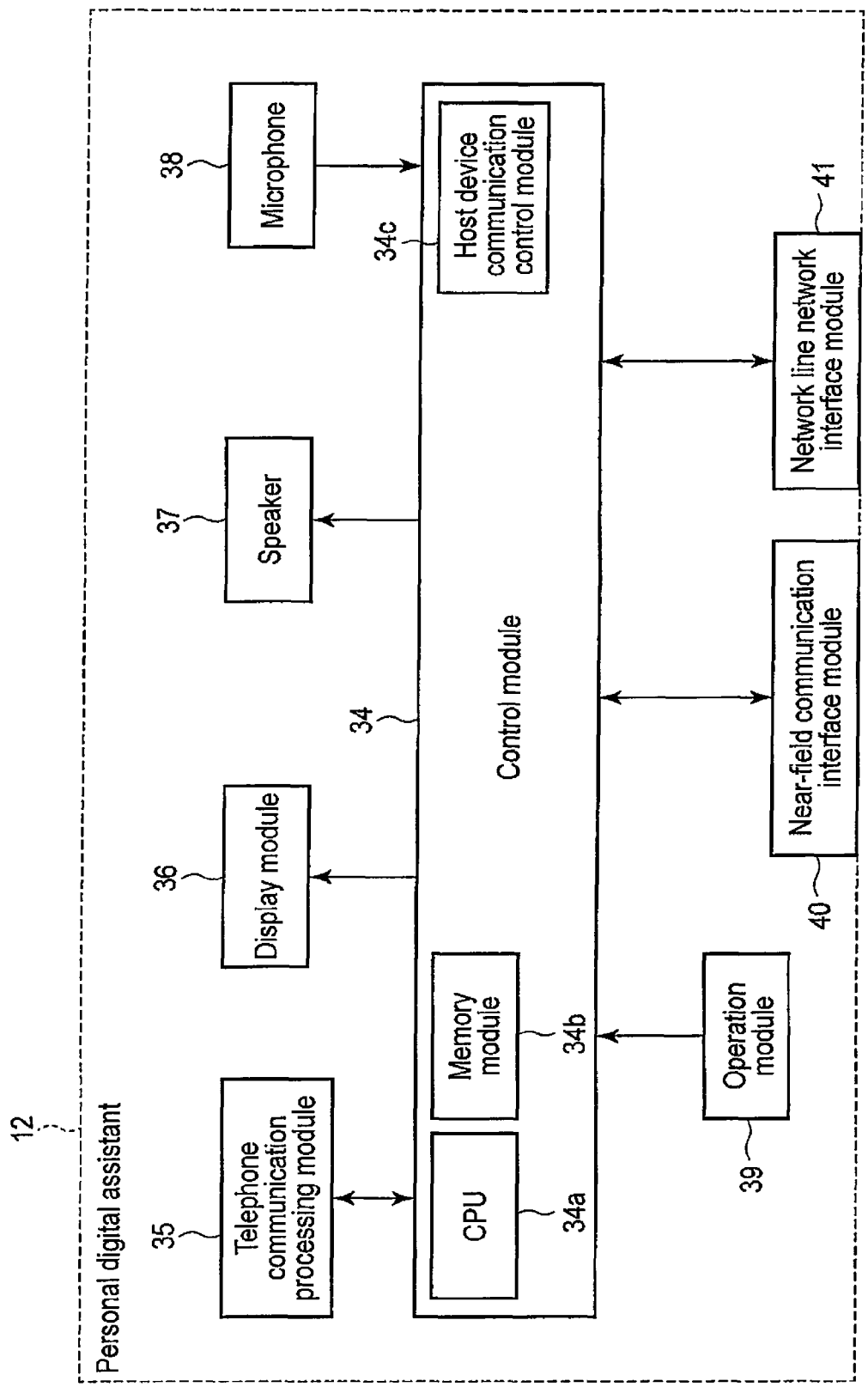
FIG. 3 is a block diagram shown to explain an example of a signal processing system of a personal digital assistant constituting the synchronous content reproduction system of the embodiment.

FIG. 3 shows an example of a signal processing system in the personal digital assistant 12. That is, the personal digital assistant 12 is provided with a control module 34 configured to control all the operations of the personal digital assistant 12 in a unifying manner, and a telephone communication processing module 35, display module 36 of a touch panel structure, speaker 37, microphone 38, operation module 39, near-field communication interface module 40, and network line network interface module 41, and the like are connected to the control module 34.

The control module 34 incorporates therein a CPU 34a, and receives operation commands from a touch panel of the display module 36 or from the operation module 39 to control each module in such a manner that the operational requirements of the operation commands are reflected. In this case, the control module 34 utilizes a memory module 34b. The memory module 34b includes a ROM in which mainly a control program to be executed by the CPU 34a is stored, RAM configured to provide a work area to the CPU 34a, and nonvolatile memory in which various setting data items, and control data items, and the like are stored.

Further, the near-field communication interface module 40 is configured to carry out near-field communication using, for example, infrared rays as a transmission medium, and enables the control module 34 to carry out interactive command transmission between the module 34 and digital television broadcast receiver 11.

Furthermore, the network line network interface module 41 is connected to the above-mentioned network line network 13, whereby it is possible for the control module 34 to arbitrarily and selectively access various servers 141 to 14n present on the network line network 13.

Further, the control module 34 is provided with a host device communication control module 34c. The host device communication control module 34c controls analysis processing of various commands and a synchronization clock received from the digital television broadcast receiver 11 serving as the host device through the near-field communication interface module 40, and transmission processing of responses to the digital television broadcast receiver 11.

FIG. 4 shows a flowchart obtained by summarizing an example of main processing operations to be carried out by the synchronous content reproduction system. That is, upon receipt of a reproduction instruction based on a operation of the user, the digital television broadcast receiver 11 executes reproduction preparation in step S4a. As the reproduction preparation, an operation of accessing a server designated by the user (for example, the server 141) to acquire content designated by the user, and analyzing attribute data, codec data, and the like of the content stream to bring the content into a state where the content can readily be reproduced at any time (for example, a pause state) is carried out.

Further, when the reproduction preparation is completed, the digital television broadcast receiver 11 inquires of the personal digital assistant 12 the reproduction capacity thereof in step S4b. As the contents to be inquired of the personal digital assistant 12, for example, a codec type (H.264, MPEG2, and WMV9), support format (MPEG2-TS, PS, ASF, MKV, mp4, and AVI) can be named.

Accordingly, the personal digital assistant 12 returns data indicating the reproduction capacity thereof to the digital television broadcast receiver 11 in step S4c. Then, the digital television broadcast receiver 11 determines whether or not the personal digital assistant 12 is provided with a condition enabling the personal digital assistant 12 to carry out reproduction by collating the condition necessary for reproduction obtained by the reproduction preparation previously carried out, and data indicating the reproduction capacity returned from the personal digital assistant 12 with each other.

Further, when the reproduction condition is satisfied, the digital television broadcast receiver 11 transmits a reproduction uniform resource locator (URL) indicating an acquisition place of content, and data designating a reproduction mode to the personal digital assistant 12 in step S4d. Examples of the data designating the reproduction mode are data indicating whether the reproduction mode is a mode of reproducing both the video and audio, mode of reproducing only the video or mode of reproducing only the audio, data designating an audio track (corresponding to, for example, a language), data designating a video track (corresponding to, for example, an angle), and the like.

Then, in step S4e, the personal digital assistant 12 accesses a server (server 141 in this case) on the basis of the reproduction URL, acquires content identical to the content previously acquired by the digital television broadcast receiver 11, carries out reproduction preparation to bring the content into a state where the content can readily be reproduced at any time (for example, the pause state) and, when the reproduction preparation is completed, the personal digital assistant 12 returns a completion notification to the digital television broadcast receiver 11 in step S4f.

By the above-mentioned processing of steps S4a to S4f, both the digital television broadcast receiver 11, and personal digital assistant 12 are set to a state where they can readily reproduce the same content at any time.

The digital television broadcast receiver 11 which has received the completion notification of the reproduction preparation from the personal digital assistant 12 in this way transmits a system clock in step S4g to the personal digital assistant 12 in order to start processing of synchronizing the clock with the personal digital assistant 12. The system clock is a clock serving as a criterion of reproduction and, in general, a system time clock (STC) is used as the clock.

Then, the personal digital assistant 12 executes processing of synchronizing a system clock managed by the personal digital assistant 12 with the system clock supplied from the digital television broadcast receiver 11, and returns a synchronization completion notification to the digital television broadcast receiver 11 in step S4*h*.

Further, the processing of synchronizing the system clock of the personal digital assistant 12 with the system clock of the digital television broadcast receiver 11 is carried out also for the purpose of obtaining the communication delay time δ between the digital television broadcast receiver 11 and personal digital assistant 12.

That is, assuming that the transmission time of the system clock at the digital television broadcast receiver 11 is Ts, time of reception of the synchronization completion notification from the personal digital assistant 12 is Tr, time of reception of the system clock at the personal digital assistant 12 is tr, and time of transmission of the synchronization completion notification to the digital television broadcast receiver 11 is ts, the communication delay time δ of a round trip between the digital television broadcast receiver 11 and personal digital assistant 12 can be calculated by using the following formula.

$$\delta = (Tr - Ts) - (ts - tr)$$

By the processing of steps S4*g*, and S4*h* described above, the clock synchronization processing, and calculation processing of the communication delay time δ of the round trip between the digital television broadcast receiver 11 and personal digital assistant 12 are carried out.

Thereafter, in step S4*i*, the digital television broadcast receiver 11 transmits a play command to start reproduction to the personal digital assistant 12, the personal digital assistant 12 which has received the play command shifts from the reproduction preparatory state to the reproduction state, and reproduces content acquired from the place designated by the reproduction URL on the basis of the contents designated by the reproduction mode. Further, in step S4*j*, the personal digital assistant 12 returns data indicating that the personal digital assistant 12 has shifted to the reproduction state to the digital television broadcast receiver 11.

On the other hand, assuming that the communication delay time of the outward trip, and communication delay time of the return trip are equal to each other when communication with the personal digital assistant 12 is carried out, the digital television broadcast receiver 11 can carry out synchronous reproduction of content between itself and the personal digital assistant 12 by shifting from the reproduction preparatory state to the reproduction state after an elapse of a time δ/2 from the transmission of the play command on the basis of the communication delay time 6 of the round trip between the digital television broadcast receiver 11 and personal digital assistant 12 calculated previously.

By the processing of steps S4*i* and S4*j*, it is possible, between the digital television broadcast receiver 11 and personal digital assistant 12, to start synchronous reproduction of video on, for example, the digital television broadcast receiver 11, and that of audio on the personal digital assistant 12.

In this way, when the synchronous reproduction is started between the digital television broadcast receiver 11 and personal digital assistant 12, hereafter the digital television broadcast receiver 11 periodically (for example, once every ten seconds) transmits the system clock, and current reproduction time Tp to the personal digital assistant 12 as shown in step S4*k*.

Further, in step S4*l*, the personal digital assistant 12 returns data indicating that the system clock, and reproduction time Tp have been received to the digital television broadcast receiver 11. In this case, the reproduction time Tp is data indicating the reproduction position of the stream and, in general, the presentation time stamp (PTS) is used as the data.

Here, the reason for periodically transmitting the system clock from the digital television broadcast receiver 11 to the personal digital assistant 12 is that the transmission of the system clock is carried out for the purpose of calculating the communication delay time δ between the digital television broadcast receiver 11 and personal digital assistant 12 of a case where the personal digital assistant 12 has changed its position, and reducing the long-term jitter between the digital television broadcast receiver 11 and personal digital assistant 12.

Further, the reason for periodically transmitting the reproduction time Tp from the digital television broadcast receiver 11 to the personal digital assistant 12 is that the transmission of the reproduction time Tp is carried out for the purpose of coinciding the reproduction position of the digital television broadcast receiver 11, and reproduction position of the personal digital assistant 12 with each other. That is, the digital television broadcast receiver 11 transmits an amount of time obtained by subtracting the communication delay time δ/2 from the reproduction time Tp to the personal digital assistant 12, and the personal digital assistant 12 coincides the reproduction time Tp of its own with the received reproduction time Tp, whereby it is possible to achieve synchronization of the reproduction time Tp between the digital television broadcast receiver 11 and personal digital assistant 12.

According to the above-mentioned embodiment, it becomes possible to synchronize content (for example, video) reproduced by the digital television broadcast receiver 11, and content (for example, audio) reproduced by the personal digital assistant 12 with each other, and remarkably improve the degree of freedom of the case where the user combines devices with each other to carry out synchronous reproduction without providing a broadband communication path capable of transmitting a stream adaptable to video, audio or the like between the digital television broadcast receiver 11 and personal digital assistant 12.

Next, a processing operation to be carried out in a so-called normal synchronous reproduction state where synchronous reproduction of content is started between the digital television broadcast receiver 11 and personal digital assistant 12, the system clock and reproduction time Tp are periodically transmitted from the digital television broadcast receiver 11 to the personal digital assistant 12, and a reply associated with the transmission of the system clock and reproduction time Tp is transmitted from the personal digital assistant 12 to the digital television broadcast receiver 11, and when the personal digital assistant 12 has been moved to the outside of the communication range within which communication with the digital television broadcast receiver 11 is to be carried out will be described below.

Figure 5:
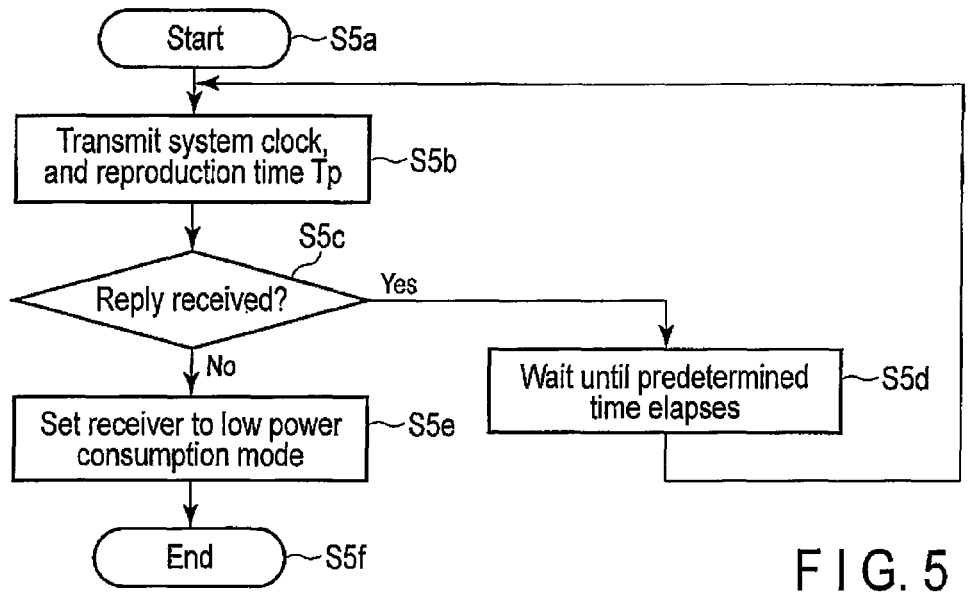
FIG. 5 is a flowchart shown to explain an example of main processing operations to be carried out by the digital television broadcast receiver of the embodiment.

FIG. 5 shows a flowchart obtained by summarizing an example of main processing operations to be carried out by the digital television broadcast receiver 11 serving as the host when the personal digital assistant 12 is moved to the outside of the communication range. That is, when the processing is started (step S5*a*), the digital television broadcast receiver 11 transmits the system clock, and reproduction time Tp to the personal digital assistant 12 in step S5*b*, and determines in step S5*c* whether or not a reply from the personal digital assistant 12 has been received.

Further, when it is determined that the reply from the personal digital assistant 12 has been received (YES), the digital television broadcast receiver 11 waits for an elapse of a predetermined time (for example, ten seconds) in step S5*d*, and is thereafter shifted to the processing of step S5*b*.

Further, when it is determined in step S5*c* that the reply from the personal digital assistant 12 has not been received (NO), the digital television broadcast receiver 11 automatically sets itself to the low power consumption mode in step S5*e* to terminate the processing (step S5*f*).

In this case, the low power consumption mode implies reduction of the power consumption by stopping the content reproduction operation on the digital television broadcast receiver 11 by using a method of turning off, for example, the backlight (not shown) used in the aforementioned video display module 23.

That is, the fact that the digital television broadcast receiver 11 does not receive the reply from the personal digital assistant 12 means that there is a strong possibility of the user carrying the personal digital assistant 12 having moved to the outside of the range within which communication with the digital television broadcast receiver 11 can be carried out, and hence it can be determined that the user does not visually confirm the display video of the digital television broadcast receiver 11. Accordingly, the reproduction operation of the digital television broadcast receiver 11 is automatically stopped to reduce the power consumption.

It should be noted that even when the digital television broadcast receiver 11 is set to the low power consumption mode, and the content reproduction operation is stopped, on the personal digital assistant 12, reproduction of content (for example, audio) is continuously carried out as it is.

Further, when the personal digital assistant 12 has been moved to the outside of the communication range within which communication with the digital television broadcast receiver 11 is to be carried out, and the system clock, and reproduction time Tp from the digital television broadcast receiver 11 have become unable to be received, it is possible for the user, even when the user carrying the personal digital assistant 12 has moved to the outside of the communication range, to continuously view and listen to the video and audio as they are by automatically carrying out reproduction of the video in addition to reproduction of the audio.

Figure 6:
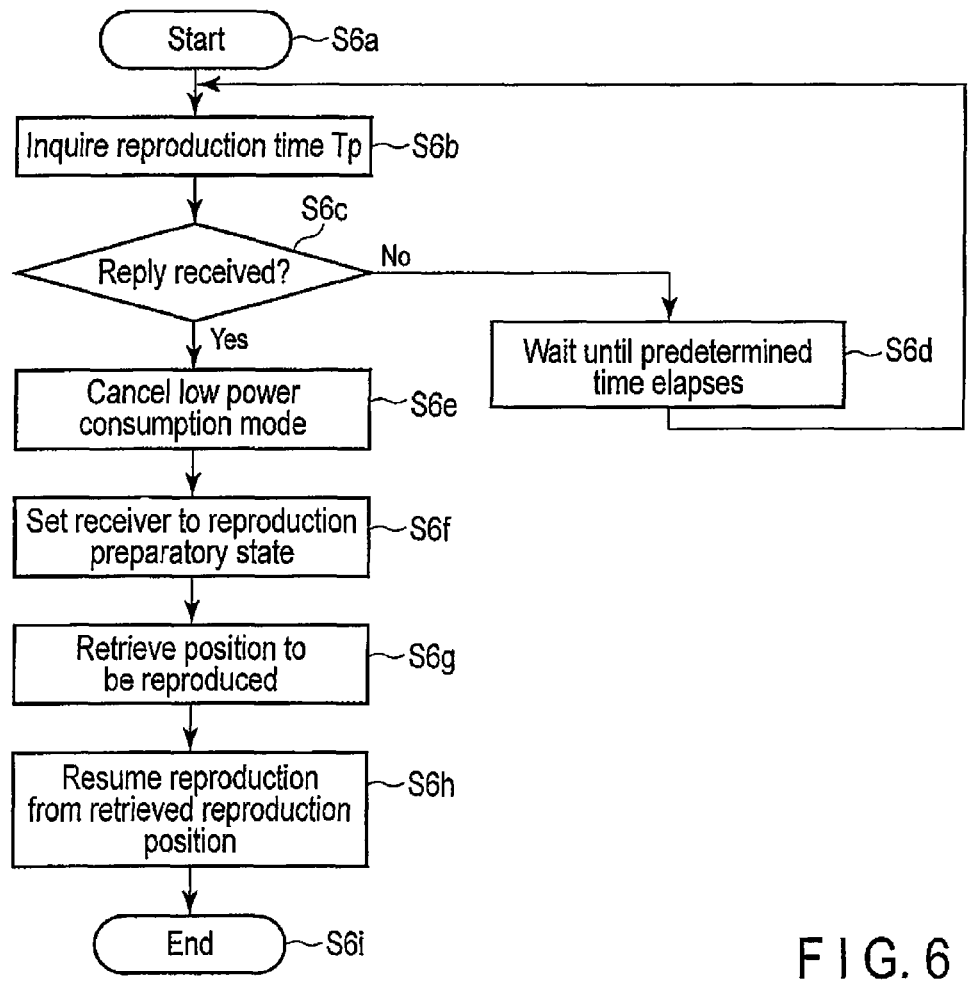
FIG. 6 is a flowchart shown to explain an example of main processing operations to be carried out by the digital television broadcast receiver of the embodiment placed in a low power consumption mode.

FIG. 6 shows a flowchart obtained by summarizing an example of main processing operations to be carried out by the digital television broadcast receiver 11 in a state where the digital television broadcast receiver 11 is set to the aforementioned low power consumption mode. That is, when the processing is started (step S6*a*) in the state where the digital television broadcast receiver 11 is set to the low power consumption mode, the digital television broadcast receiver 11 inquires of the personal digital assistant 12 the reproduction time Tp indicating the currently reproduced position in step S6*b*, and determines in step S6*c* whether or not a reply from the personal digital assistant 12 has been received.

Further, when it is determined that the reply from the personal digital assistant 12 has not been received (NO), the digital television broadcast receiver 11 waits for an elapse of a predetermined time (for example, ten seconds) in step S6*d*, and is thereafter shifted to the processing of step S6*b*.

Further, when it is determined in step S6*c* that the reply from the personal digital assistant 12 has been received (YES), the digital television broadcast receiver 11 cancels the low power consumption mode in step S6*e*, turns on the backlight (not shown) used in the video display module 23, and the digital television broadcast receiver 11 is set to the reproduction preparatory state where content can readily be reproduced at any time (for example, a pause state) in step S6*f*.

Thereafter, in step S6*g*, the digital television broadcast receiver 11 retrieves a position to be reproduced by the receiver 11 itself on the basis of the reproduction time Tp indicating the position currently reproduced by the personal digital assistant 12 included in the reply from the personal digital assistant 12 for which determination indicating the receipt of the reply has previously been made in step S6*c*, resumes the reproduction of the content from the retrieved reproduction position in step S6*h*, and then terminates the processing (step S6*i*).

That is, in the state where the digital television broadcast receiver 11 is unable to carry out communication with the personal digital assistant 12, and is set to the low power consumption mode, the digital television broadcast receiver 11 periodically carries out an inquiry about the reproduction time Tp indicating the position currently reproduced, the inquiry being directed to the personal digital assistant 12.

Further, when a reply to the inquiry has been received, the digital television broadcast receiver 11 determines that it has become possible to carry out communication with the personal digital assistant 12, and resumes reproduction of the content from the position currently reproduced by the personal digital assistant 12. Thereby, it becomes possible to synchronously reproduce the video on the digital television broadcast receiver 11, and audio on the personal digital assistant 12.

It should be noted that as described previously, when the personal digital assistant 12 has been moved to the outside of the communication range within which communication with the digital television broadcast receiver 11 is to be carried out, and the system clock, and reproduction time Tp from the digital television broadcast receiver 11 have become unable to be received, if reproduction of video has also been carried out in addition to the reproduction of the audio, the personal digital assistant 12 is automatically switched to a state where only the audio is reproduced, when the state where communication with the digital television broadcast receiver 11 can be carried out is restored.

Figure 7:
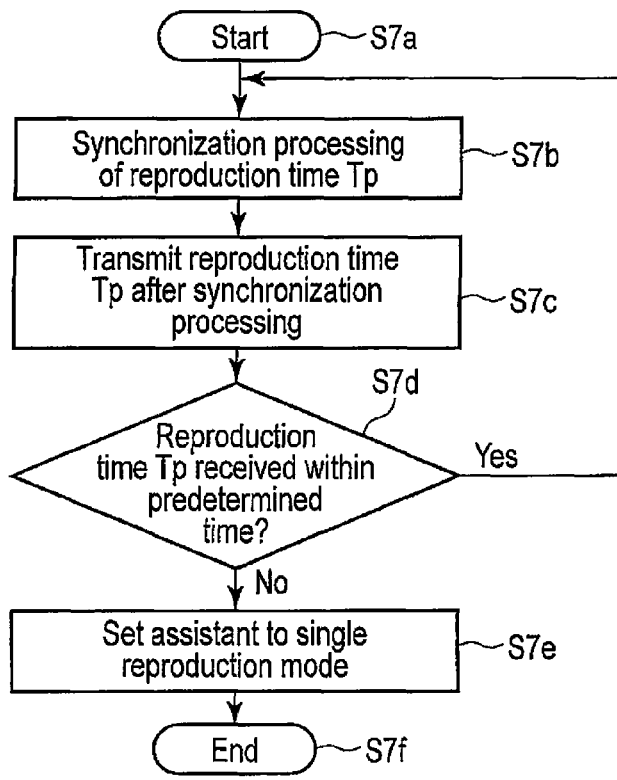
FIG. 7 is a flowchart shown to explain an example of main processing operations to be carried out by the personal digital assistant of the embodiment.

FIG. 7 shows a flowchart obtained by summarizing an example of main processing operations to be carried out by the personal digital assistant 12 serving as the slave when the personal digital assistant 12 has been moved to the outside of the range of communication with the digital television broadcast receiver 11. That is, when the processing is started (step S7*a*), the personal digital assistant 12 carries out, in step S7*b*, synchronization processing of synchronizing the reproduction time Tp of its own with the reproduction time Tp supplied from the digital television broadcast receiver 11, and transmits the reproduction time Tp of its own after the synchronization processing to the digital television broadcast receiver 11 in step S7*c*.

Thereafter, the personal digital assistant 12 determines in step S7*d* whether or not the reproduction time Tp transmitted from the digital television broadcast receiver 11 has been received within a predetermined time (for example, ten seconds), and when it is determined that the reproduction time Tp has been received within the predetermined time (YES), the personal digital assistant 12 is shifted to the processing of step S7*b*.

Further, when it is determined in step S7*d* that the reproduction time Tp transmitted from the digital television broadcast receiver 11 has not been received within the predetermined time (for example, ten seconds) (NO), the personal digital assistant 12 automatically sets itself to the single reproduction mode in step S7e, and then terminates the processing (step S7f).

In this case, the single reproduction mode implies a mode in which the personal digital assistant 12 carries out reproduction of content singly by itself without synchronizing the reproduction time Tp thereof with the reproduction time supplied from the digital television broadcast receiver 11. It should be noted that as the contents to be reproduced, although only the audio may be reproduced, both the video and audio may be reproduced together.

That is, the fact that the personal digital assistant 12 does not receive the reproduction time Tp from the digital television broadcast receiver 11 within the predetermined time means that there is a strong possibility of the user carrying the personal digital assistant 12 having moved to the outside of the range within which communication with the digital television broadcast receiver 11 can be carried out, and hence it can be determined that the user does not visually confirm the display video of the digital television broadcast receiver 11. Accordingly, the personal digital assistant 12 is automatically set to the single reproduction mode so that the user can continuously view and listen to the content.

Figure 8:
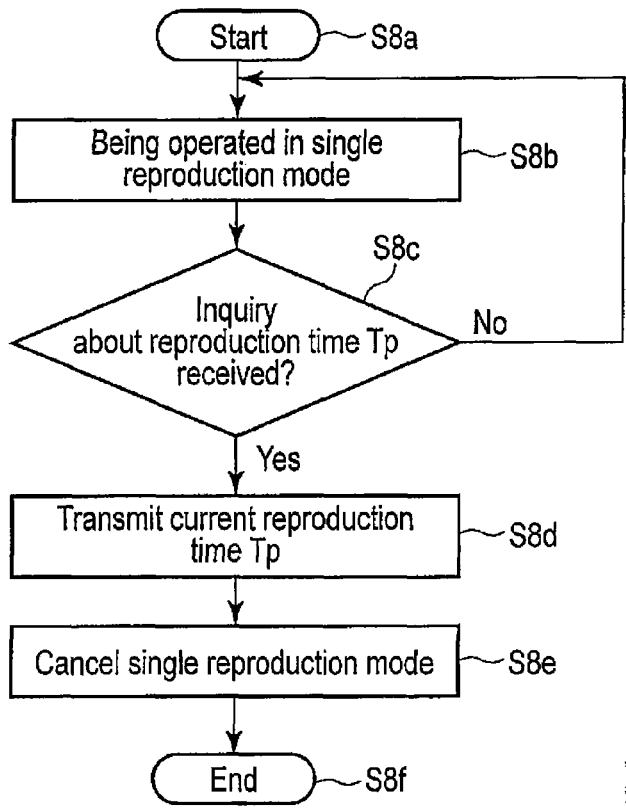
FIG. 8 is a flowchart shown to explain an example of main processing operations to be carried out by the personal digital assistant of the embodiment placed in a single reproduction mode.

FIG. 8 shows a flowchart obtained by summarizing an example of main processing operations to be carried out by the personal digital assistant 12 in a state where the personal digital assistant 12 is set to the aforementioned single reproduction mode. That is, when the processing is started (step S8a), while executing an operation in the single reproduction mode in step S8b, the personal digital assistant 12 determines in step S8c whether or not an inquiry about the reproduction time Tp has been received from the digital television broadcast receiver 11.

Further, when it is determined that the inquiry about the reproduction time Tp has not been received from the digital television broadcast receiver 11 (NO), the personal digital assistant 12 is shifted to the processing of step S8b and, when it is determined that the inquiry has been received (YES), the personal digital assistant 12 transmits the current reproduction time Tp thereof to the digital television broadcast receiver 11 in step S8d, cancels the single reproduction mode in step S8e, and then terminates the processing (step S8f).

That is, upon receipt of an inquiry about the reproduction time Tp from the digital television broadcast receiver 11, the personal digital assistant 12 which has been unable to communicate with the digital television broadcast receiver 11 determines that it has become possible for the assistant 12 to communicate with the digital television broadcast receiver 11, and transmits the reproduction time Tp indicating the position currently reproduced by the personal digital assistant 12 to the digital television broadcast receiver 11. Thereby, it becomes possible again to synchronously reproduce the video on the digital television broadcast receiver 11, and audio on the personal digital assistant 12.

Each of FIG. 9A, FIG. 9B, and FIG. 9C shows an example of a reproduction operation carried out by the digital television broadcast receiver 11 and personal digital assistant 12 by using the operation examples illustrated in FIGS. 5 to 8. That is, as shown in FIG. 9A, when reproduction is started at time T1, a case where the content (including both the video and audio) reproduction of which is to be completed at time T4 is acquired by each of the digital television broadcast receiver 11, and personal digital assistant 12 from a server (for example, the server 141), and is reproduced by each of them is considered.

In this case, it is assumed that at time T1 at which the reproduction has been started, the digital television broadcast receiver 11, and personal digital assistant 12 are in a state where they can communicate with each other, the digital television broadcast receiver 11 reproduces the video as shown in FIG. 9B, and the personal digital assistant 12 reproduces the audio as shown in FIG. 9C.

In such a state, it is assumed that the digital television broadcast receiver 11, and personal digital assistant 12 are brought into a state where they cannot communicate with each other at arbitrary time T2. Then, the digital television broadcast receiver 11 is set to a reproduction stopped state in the low power consumption mode, and the personal digital assistant 12 is set to a state where both the video and audio are reproduced in the single reproduction mode.

Thereafter, at arbitrary time T3, when the digital television broadcast receiver 11, and personal digital assistant 12 are set to a state where they can communicate with each other again, the digital television broadcast receiver 11 is set to a video reproduction state, and the personal digital assistant 12 is set to an audio reproduction state.

Here, in the above-mentioned embodiment, although the description has been given by taking the case where the digital television broadcast receiver 11 serves as the host, and the personal digital assistant 12 serves as the slave as an example, the example is not limited to this, and various content reproduction devices such as an optical disk recording/reproduction device, set top box (STB), personal computer (PC), and the like can be used.

Further, in the above-mentioned embodiment, although the description has been given by taking the case where one personal digital assistant 12 serves as the slave as an example, the example is not limited to this, and a plurality of content reproduction devices may be provided as the slaves. In this case, the content reproduction device serving as the host separately carries out communication with each of the plurality of content reproduction devices serving as the slaves to carry out synchronous reproduction of content.

For example, the content reproduction device serving as the host can carry out surround reproduction of the multichannel audio by using the plurality of content reproduction devices serving as the slaves. At this time, for example, the content reproduction device serving as the host calculates the communication delay time between itself and each of the plurality of content reproduction devices serving as the slaves, and hence it becomes possible to calculate a distance between the host device and each of the plurality of content reproduction devices serving as the slaves from the communication delay time. Accordingly, it becomes possible to optimize the audio reproduced by each of the content reproduction devices serving as the slaves as the surround audio output by using the calculated distance data.

Furthermore, in the above-mentioned embodiment, although it has been described that the digital television broadcast receiver 11, and personal digital assistant 12 acquire content including video and audio from the servers 141 to 14n on the network line network 13, and reproduce the content, the description is not limited to this and, for example, it is also possible for the digital television broadcast receiver 11 to acquire only video content, and reproduce the video content, and for the personal digital assistant 12 to acquire only audio content, and reproduce the audio content.

Further, by preserving the contents to be reproduced in storage on the network line network 13 as a file when reproduction is carried out by the host device, it becomes possible for the host device to carry out sharing of data with the slave device.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A content reproduction apparatus comprising:
a first communication module configured to carry out content transmission to a network;
an acquisition module configured to access a server on the network through the first communication module to acquire content including at least one of video and audio;
a reproduction module configured to reproduce the content acquired by the acquisition module;
a second communication module configured to carry out content transmission to a content reproduction device serving as a slave; and
a control module configured to output data indicating an acquisition place of the content acquired by the acquisition module to the content reproduction device through the second communication module to thereby control the content reproduction device in a reproduction preparatory state, and output a synchronization clock for reproduction to be carried out by the reproduction module, and reproduction request commands to the content reproduction device through the second communication module to thereby control the content reproduction device in a reproduction state.

2. The content reproduction apparatus of claim 1, wherein the control module is configured to periodically output data indicating a position currently reproduced by the reproduction module to the content reproduction device through the second communication module in a state where the content reproduction device is controlled in the reproduction state to thereby synchronize the position reproduced by the reproduction module, and a position reproduced by the content reproduction device with each other.

3. The content reproduction apparatus of claim 2, wherein the control module is configured to, when a reply to the command indicating the currently reproduced position periodically output through the second communication module is not received from the content reproduction device in a state where the content reproduction device is controlled in the reproduction state, stop the reproduction of content to be carried out by the reproduction module.

4. The content reproduction apparatus of claim 3, wherein the control module is configured to, when a reply to the command indicating the currently reproduced position periodically output through the second communication module is received from the content reproduction device in a state where reproduction of content to be carried out by the reproduction module is stopped, start the reproduction of content to be carried out by the reproduction module on the basis of data indicating the currently reproduced position of the content reproduction device included in the returned reply data.

5. A content reproduction apparatus comprising:
a first communication module configured to carry out content transmission to a network;
an acquisition module configured to access a server on the network through the first communication module to acquire content including at least one of video and audio;
a reproduction module configured to reproduce the content acquired by the acquisition module;
a second communication module configured to carry out content transmission to a content reproduction device serving as a host; and
a control module configured to receive data indicating an acquisition place of content acquired by the content reproduction device through the network from the content reproduction device through the second communication module to thereby control the reproduction module in a reproduction preparatory state, and receive a synchronization clock for reproduction, and reproduction request command from the content reproduction device to thereby control the reproduction module in a reproduction state.

6. The content reproduction apparatus of claim 5, wherein the control module is configured to periodically receive data indicating a currently reproduced position from the content reproduction device through the second communication module in a state where the reproduction module is controlled in the reproduction state to thereby synchronize a position reproduced by the reproduction module with the position reproduced by the content reproduction device.

7. The content reproduction apparatus of claim 6, wherein the control module is configured to, when data indicating a currently reproduced position is not received from the content reproduction device through the second communication module in a state where the reproduction module is controlled in the reproduction state, carry out reproduction of content by the reproduction module without synchronizing the position reproduced by the reproduction module with the position reproduced by the content reproduction device.

8. The content reproduction apparatus of claim 7, wherein the control module is configured to, when data indicating a currently reproduced position periodically output from the content reproduction device is received from the content reproduction device through the second communication module in a state where reproduction of content is carried out by the reproduction module without synchronizing the position reproduced by the reproduction module with the position reproduced by the content reproduction device, output the position of content reproduced by the reproduction module to the content reproduction device through the second communication module.

9. A content reproduction method comprising:
accessing a server on a network through a first communication module to acquire and reproduce content including at least one of video and audio to be carried out by a first content reproduction device serving as a host;
outputting data indicating an acquisition place of the content acquired by the first content reproduction device to a second content reproduction device serving as a slave through a second communication module to thereby control the second content reproduction device in a reproduction preparatory state to be carried out by the first content reproduction device; and outputting a synchronization clock for reproduction, and reproduction request command to the second content reproduction device through the second communication module to thereby control the second content reproduction device in a reproduction state to be carried out by the first content reproduction device.

\* \* \* \* \*